United States Patent
Maguire

[15] 3,634,920
[45] Jan. 18, 1972

[54] ASSEMBLY APPARATUS
[72] Inventor: Richard J. Maguire, Scituate, Mass.
[73] Assignee: The Gillette Company, Boston, Mass.
[22] Filed: Oct. 31, 1969
[21] Appl. No.: 872,839

[52] U.S. Cl. .............................29/208 F, 29/211 R, 29/227
[51] Int. Cl. ......................................B23p 19/04, B23q 7/10
[58] Field of Search .................29/211 R, 211 D, 208 C, 227, 29/208 F

[56] References Cited

UNITED STATES PATENTS 3,017,691  1/1962  Austin et al...........................29/227 X Primary Examiner—Thomas H. Eager
Attorney—Willis M. Ertman

[57] ABSTRACT

Apparatus for assembling component pairs comprising a nest structure for receiving first and second components in aligned relation, a rotary drive for the nest, a clamp structure for securing the first component in the nest to prevent rotation relative thereto comprising a pair of cooperating pincher elements which are pivotally mounted within a slot in the nest structure and which have finger portions to engage the component to be clamped and foot portions against which a member bears to cause rotation of the pincher elements and clamping of the first components, and an axial drive for causing movement of the second component against the first component. Also apparatus for the automatic high-rate assembly of such pairs of components which includes a turret having a plurality of such nest structures rotatably mounted thereupon, rotary drives for rotating the turret and for rotating the nests relative thereto, delivery systems for delivering first and second components in aligned relation sequentially to said nest structures, a system to remove the pair from said nest structure after assembly, a shuttle mounted adjacent the turret including the axial drive, and means for causing the shuttle to rotate such that the axial drive is aligned with a nest structure for a portion of each complete revolution of the turret and for actuating the axial drive when so aligned.

11 Claims, 8 Drawing Figures

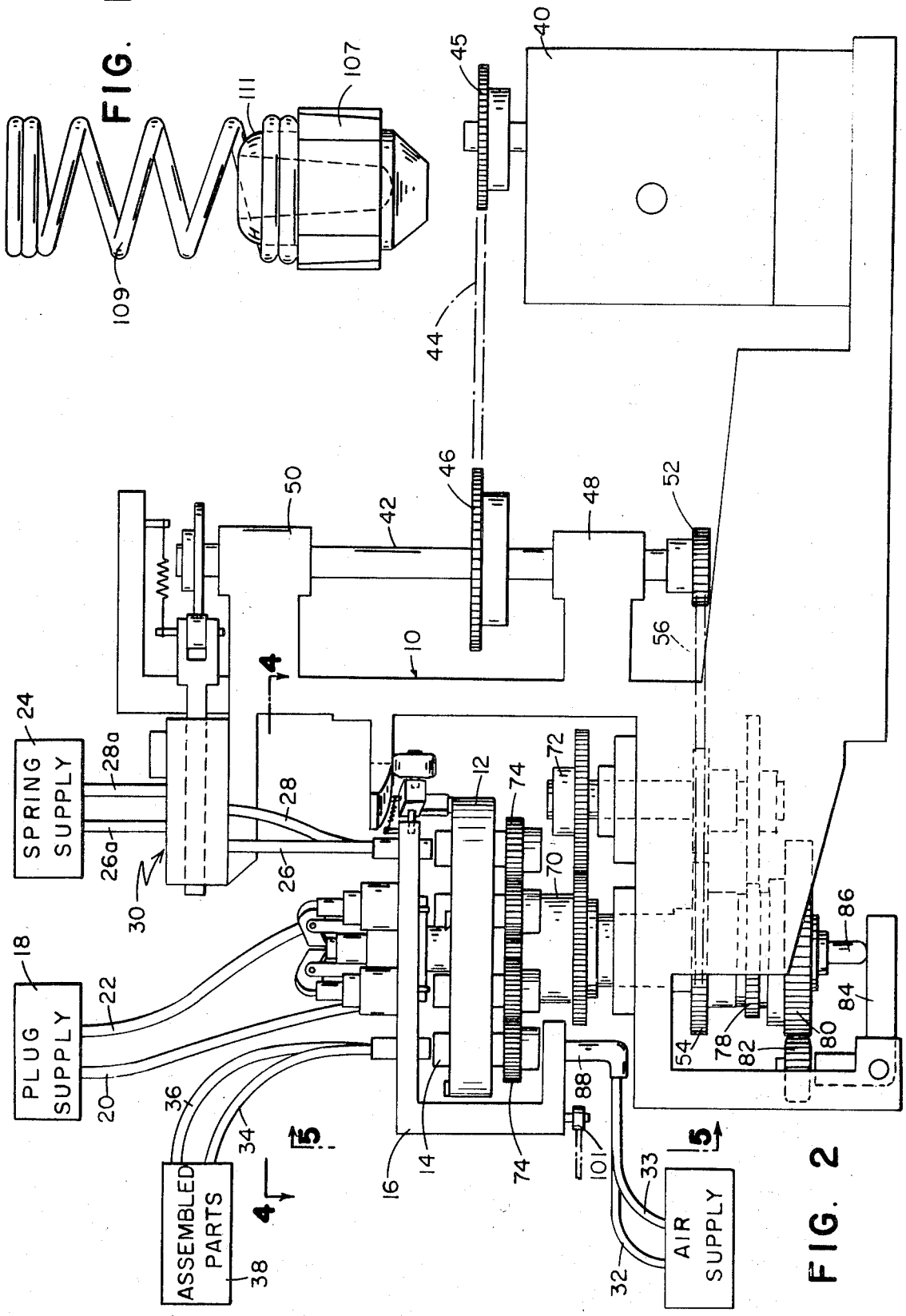

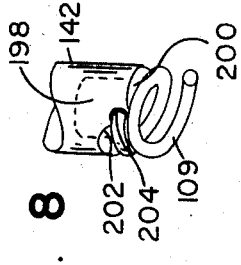
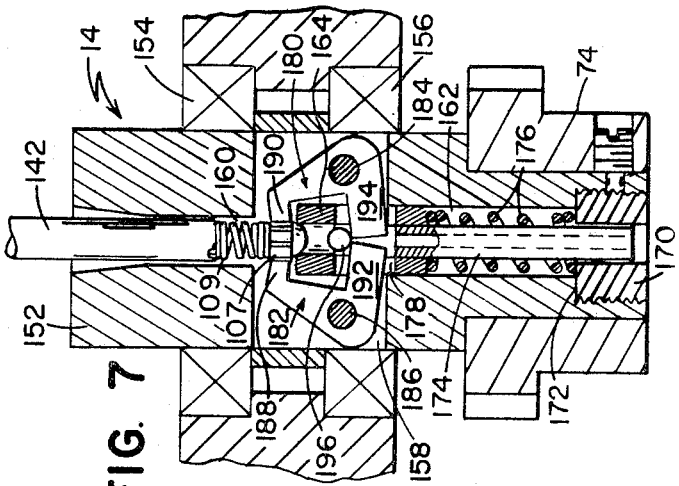
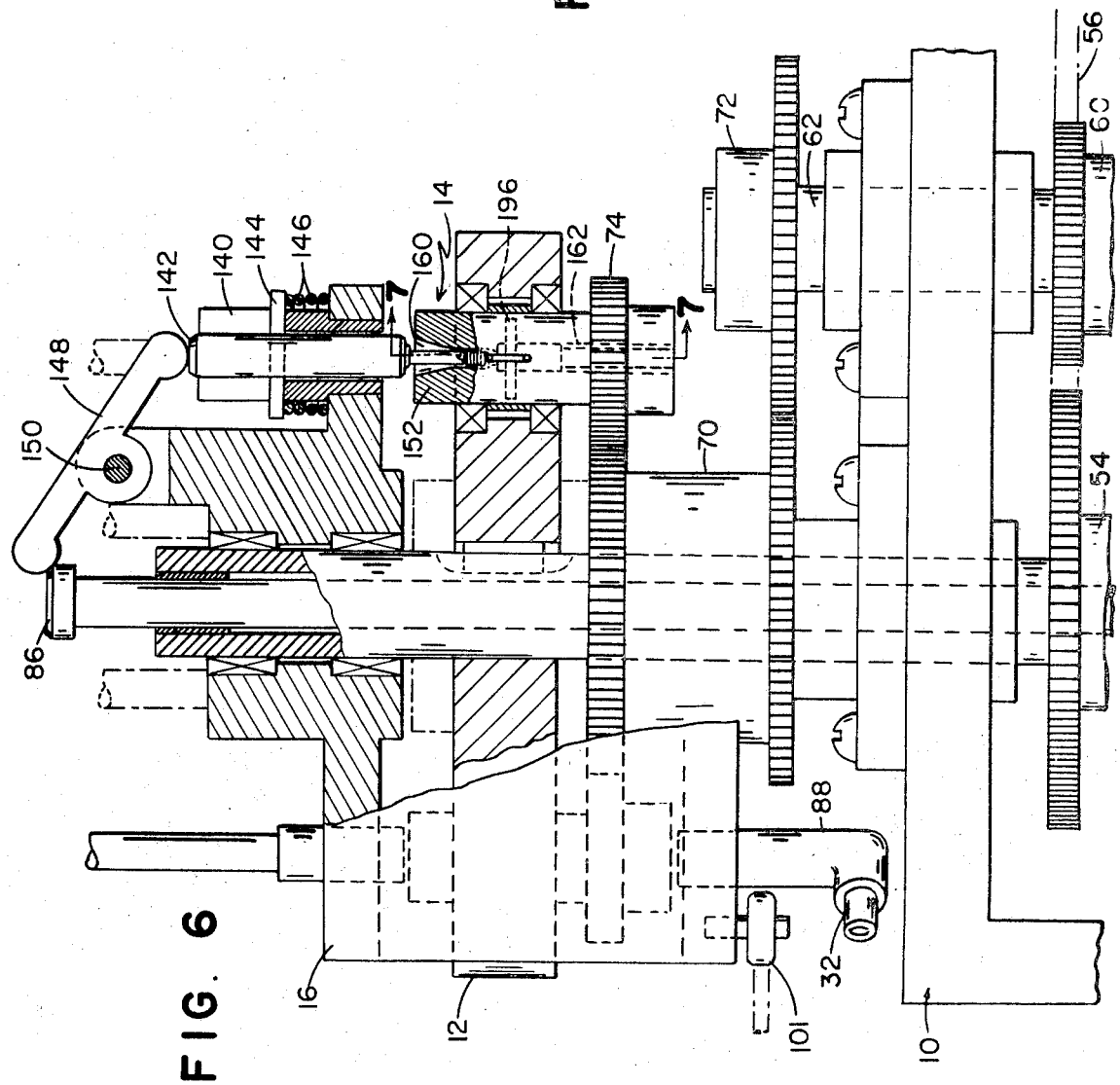

ASSEMBLY APPARATUS

SUMMARY OF THE INVENTION

This invention relates to apparatus for the automatic assembly of component pairs.

It is an object of the invention to provide apparatus of economical construction and operation which will accurately assemble component pairs.

It is a further object to provide such apparatus which is capable of assembling components of relatively small size.

Another object of the invention is to provide such apparatus which is capable of high-rate assembly of component pairs.

In accordance with the invention, there is provided apparatus for assembling component pairs which includes a nest structure for receiving first and second components in aligned relation, a rotary drive for the nest, and a clamp structure for securing the first component in the nest to prevent rotation relative thereto. An axial drive is provided for causing movement of the second component against the first component within the nest structure. There are also means responsive to the axial movement of the second component, in response to the axial drive, to actuate the clamp structure and thereby rotate the first component with the nest while the second component is forced thereagainst, securing together the first and second components. In particular embodiments clamping structure includes a pair of cooperating pincher elements which are pivotally mounted within a slot in the nest structure, each pincher element having a finger portion to engage the component to be clamped and a foot portion. The means responsive to axial movement of the second component includes a spring-loaded plunger arranged to bear upon each pincher foot portion to cause rotation of the pincher elements and consequent clamping of the first component by the pincher fingers.

The invention also features apparatus for the automatic high-rate assembly of pairs of first and second components which includes a turret having a plurality of nest structures, as described above, rotatably mounted thereupon, rotary drives for rotating the turret and for rotating the nests relative thereto, delivery systems for delivering first and second components in aligned relation sequentially to said nest structures, and a system to remove the pair from said nest structure after assembly. A shuttle is mounted adjacent the turret and has the above-mentioned axial drive mounted thereupon.

Means are provided for causing the shuttle to rotate such that the axial drive is aligned with a nest structure for a portion of each complete revolution of the turret and for actuating the axial drive when so aligned.

The invention has particular utility in assembling pairs in which the first component has a stub protruding therefrom and the second component is a coil spring to be engaged with the stub. When the components are relatively small (e.g., the stub being 0.117 inch in diameter and the coil spring having an inner diameter of 0.110 inch) it is preferred that the delivery and removal systems employ plastic tubing connected to sources of air pressure or vacuum, as required.

Other objects, features, and advantages will appear from the following description of a preferred embodiment, taken together with the attached drawings thereof. This description of a particular embodiment is in an illustrative and not a limiting sense as other embodiments of the invention will be apparent to those skilled in the art. In the drawings:

FIG. 1 is a side elevation of an assembled spring and plug pair;

FIG. 2 is a somewhat schematical side elevation of apparatus constructed according to the invention;

FIG. 6 is a front elevation, partially in section, of a portion of the apparatus of FIG. 2, showing detail of an operative station and a nest element thereof;

FIG. 7 is a section taken at 7—7 of FIG. 6; and

FIG. 8 is a detailed view of a portion of the apparatus shown in FIGS. 5 and 6.

DESCRIPTION OF A PREFERRED EMBODIMENT

Figure 3:
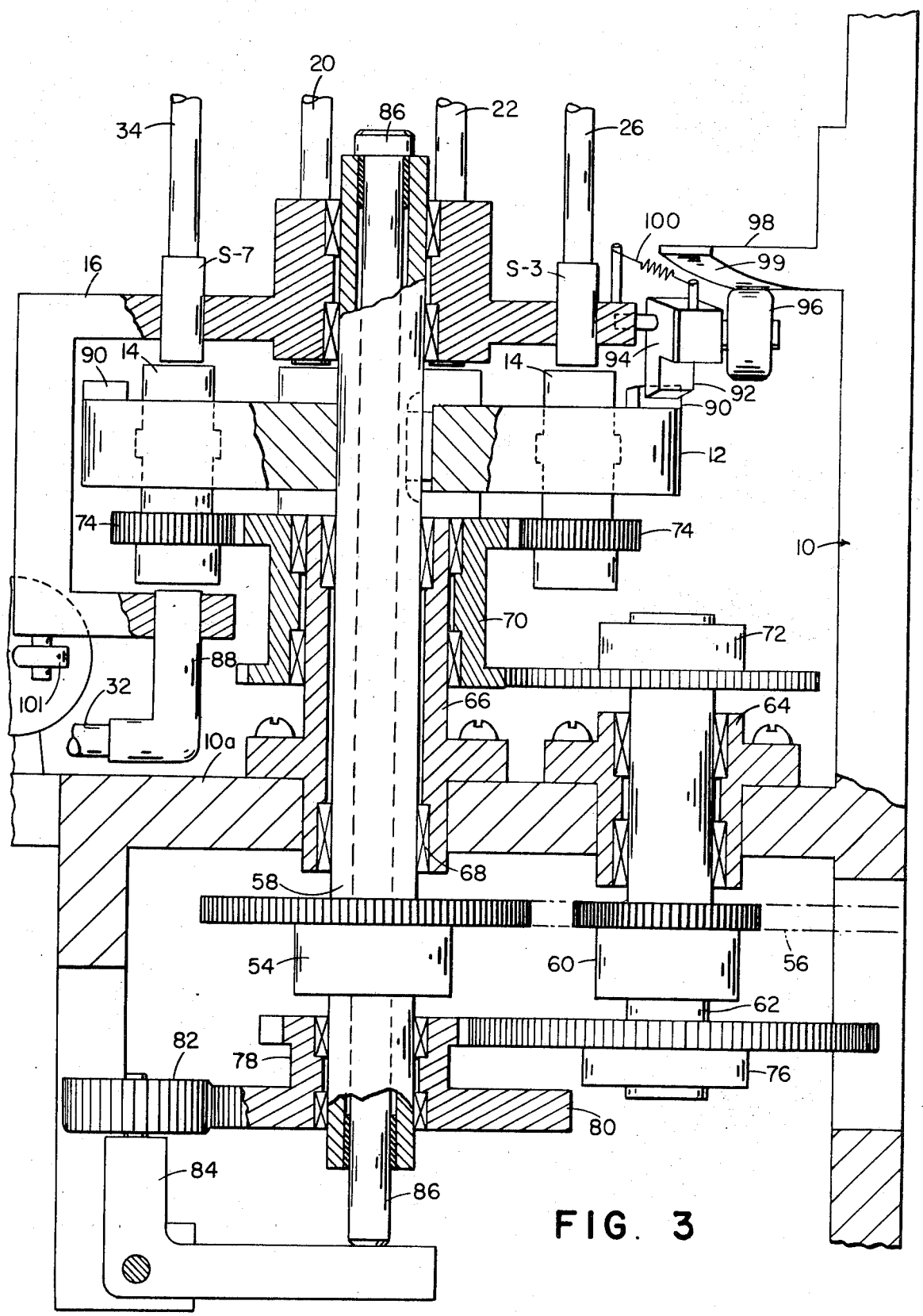
FIG. 3 is a side elevation, partially in section, showing the drive mechanism for the apparatus of FIG. 1.

The preferred embodiment to be described is specifically designed to assemble the valve plugs and coil springs which form a portion of the structure described in U.S. Pat. No. 3,454,198, to John Barry Flynn for "Dispensing Device."

An assembled plug 107 and spring 109 pair is shown in FIG. 1. The plug 107 is molded of Lexan (a polycarbonate resin) and has a maximum diameter of 0.120 inch. The stub portion 111 of the plug 107 to which the spring 109 is affixed has a diameter of 0.117 inch. The spring 109 is constructed from 0.018-inch wire formed to an inner diameter of 0.110 inch.

FIG. 2 shows, somewhat schematically, the relationship of the various portions of apparatus designed to assemble such valve plugs 107 and loading springs 109. The apparatus is mounted upon a frame member 10, which may conveniently be a table so that component supply equipment and an assembled pair receiving bin may be placed on top of the table.

The apparatus includes a turret 12 upon which are mounted a plurality of nest structure 14. In the preferred form illustrated, there are eight of these nest structures 14 mounted on turret 12. A shuttle 16 is mounted for rotary motion (as described in detail below) with relation to turret 12. Shuttle 16 has eight operative stations (seen best in FIG. 3) mounted thereon, the same as the number of nests 14. Although only four steps are required for assembly of plug 107 and a spring 109, an efficient and rapid rate assembly apparatus can be constructed if there are two separate assembly processes occurring simultaneously. The eight nests 14 and eight operative stations on shuttle 16 provide capability for two separate simultaneous assembly processes. The eight operative stations of shuttle 16 are best seen in FIG. 4 where they are labeled S-1 through S-8. The station functions are as follows: S-1 and S-2 are plug 107 supply stations, S-3 and S-4 are spring 109 supply stations, S-5 and S-6 are the stations where actual assembly takes place, and S-7 and S-8 are assembled pair removal stations.

As described in detail below, the supply of plugs and springs and the removal of assembled pairs from the nest 14 all take place by means of air pressure and vacuum systems. Thus the schematic illustration of FIG. 2 shows a plug 107 supply source 18 with two separate supply tubes 20 and 22 which lead to operative stations S-1 and S-2. Similarly, a spring supply source 24 supplies springs 109 through tubes 26 and 28 to operative stations S-3 and S-4 after proceeding through a transfer device 30 described in detail below. Air supply tubes 32, 33 provide the means for removal of assembled spring and plug pairs through tubes 34 and 36 to an assembled parts bin 38. It has been found that the velocity attained by the assembled components within tubes 34 and 36 under the influence of the 85 p.s.i. air pressure supplied by tubes 32, 33 is such that it is desirable to provide a hood over the assembled parts bin 38. Such hoods are well known of the art and need not be described in detail. Basically, the hood comprises a closed box with an outlet hole in the bottom and inlet couplings for tubes 34 and 36 in one end. The entire interior of the hood is lined with a material capable of absorbing much of the energy of the high-velocity spring and plug pairs. A lining of foam rubber has been found adequate for this purpose.

As shown in FIG. 2, motor 40 drives main drive shaft 42 by means of chain 44 linking the motor sprocket 45 to sprocket 46 which is keyed to main drive shaft 42. The main drive shaft 42 is supported in pillow blocks 48 and 50, which in turn are rigidly affixed to frame member 10. The motor and the sprockets 45, 46 are chosen so that the main drive shaft 42 will be rotated at approximately 50 r.p.m. Sprocket 52 is keyed to main drive shaft 42 and is maintained in axial location by a set screw (not shown) in a conventional fashion. Drive chain 56 engages the teeth of sprocket 52.

Figure 4:
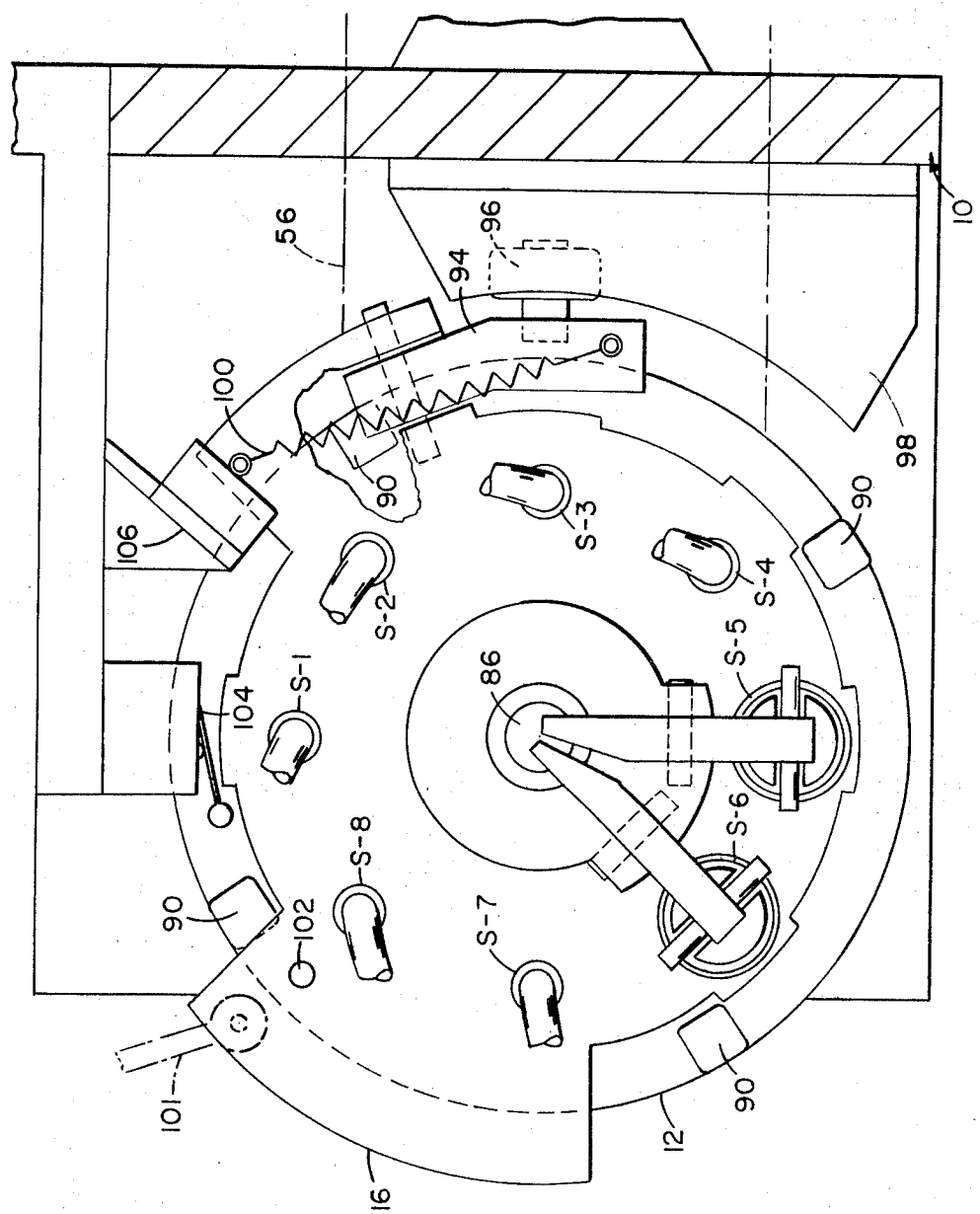
FIG. 4 is a view taken at 4—4 of FIG. 2.

The details of the rotary drives for turret 12 and nests 14 are now considered with reference to FIG. 3. Turret drive sprocket 54 is splined to turret drive shaft 58. Chain 56 engages turret drive sprocket 54 and also sprocket 60 which is splined to shaft 62. The reduction caused by the sizing of sprockets 52 and 54 results in a rotation of the turret at approximately 25 r.p.m. Shaft 62 and turret drive shaft 58 are supported by means of thrust bearings 64 and 66 respectively. Roller bearings (a typical bearing indicated at 68) permit free rotation of both shafts.

The sprockets 54 and 60 are driven by chain 56 in opposite senses to permit the rotation of the nests 14 of opposite sense of that of turret 12. To this end gear 70 connects gear 72 which is splined to shaft 62 and gears 74 affixed to each nest element 14.

The additional gear 76 on shaft 62 engages gear 78 rotatably mounted about turret drive shaft 58. Gear 78 has a cam plate 80 integral therewith, which is ridden by cam follower 82 mounted on the end of pivoted arm 84. The cam follower 82 and pivoted arm 84 convert the rotary asymmetry of the cam plate 80 into a vertical motion of plunger 86 which is slidably mounted within turret drive shaft 58 and which rests upon arm 84. The gearing and cam configuration are such that the up and down motion of plunger 86 occurs four times during each revolution of turret 12.

FIG. 3 has been simplified by eliminating all but two of the nest elements 14. The two nest elements shown are aligned with operative stations S-3 and S-7 of shuttle 16. Thus one nest is shown in position to receive a spring from supply tube 26 and the other nest is shown in position to eject a spring and plug assembly into tube 34. The air pressure which causes this ejection of assembled spring and plug pairs is supplied through tube 32 through a coupling member 88 mounted in shuttle 16 directly below operative station S-7.

Turret 12 has four teeth 90 mounted at 90° increments about its periphery. A pawl 92 is attached to one end of an L-shaped pivoted lever arm 94 which is affixed to shuttle 16 and whose other end supports a roller 96. Roller 96 engages the underside of a cam plate 98. Spring 100, connecting arm 94 and frame 10, maintains the engagement of roller 96 on cam plate 98. The point of attachment of spring 100 to the frame member is higher than the point of attachment to pivoted arm 94. Therefore the influence of spring 100 upon roller 96 is both upward as viewed in FIG. 3 and counterclockwise as viewed in FIG. 4. A conventional air spring 101 (see FIGS. 4 and 6) is connected to bias shuttle 16 in a counterclockwise sense as viewed in FIG. 4.

Again referring to FIG. 4, shuttle 16 has upstanding stud 102 positioned to strike and close a microswitch 104 should the shuttle fail to release from the turret 12 at the proper time. The closure of microswitch 104 causes immediate stoppage of the apparatus by means of conventional circuitry and associated equipment.

Rubber bumper 106 is affixed to the frame member in a position to absorb the energy of the shuttle after release from the turret and counterrotation under the influence of air spring 101.

It has been found that the handling of components of the sizes previously indicated is facilitated by using plastic tubing and air pressure or vacuum sources as required, to transport such components in both their assembled and unassembled states. Reference has already been made to the tubes 20, 22, 26, 28, 34 and 36 in FIG. 2. Details of the air pressure and vacuum systems will appear in the following description.

Again referring to FIG. 2, the plug supply mechanism 18 preferably comprises a vibrating bowl assembly which continuously presents aligned plugs 107 to a conventional escapement mechanism (not shown). The escapement delivers plugs 107 one at a time to each of tubes 20 and 22. Plug supply assembly 18 also includes a source of air pressure connected to tubes 20 and 22.

The spring supply assembly 24 is very similar to the plug assembly 18 just described. However, as will be understood by those skilled in the art, the nature of the spring 109 makes it difficult to provide an escapement which delivers them one at a time to tubes which have a source of air pressure connected thereto. Thus transfer device 30 is required which includes a source of vacuum connected to the tubes 26a and 28a connecting device 30 with spring supply assembly 24. The transfer device 30 is best shown in FIG. 5.

Figure 5:
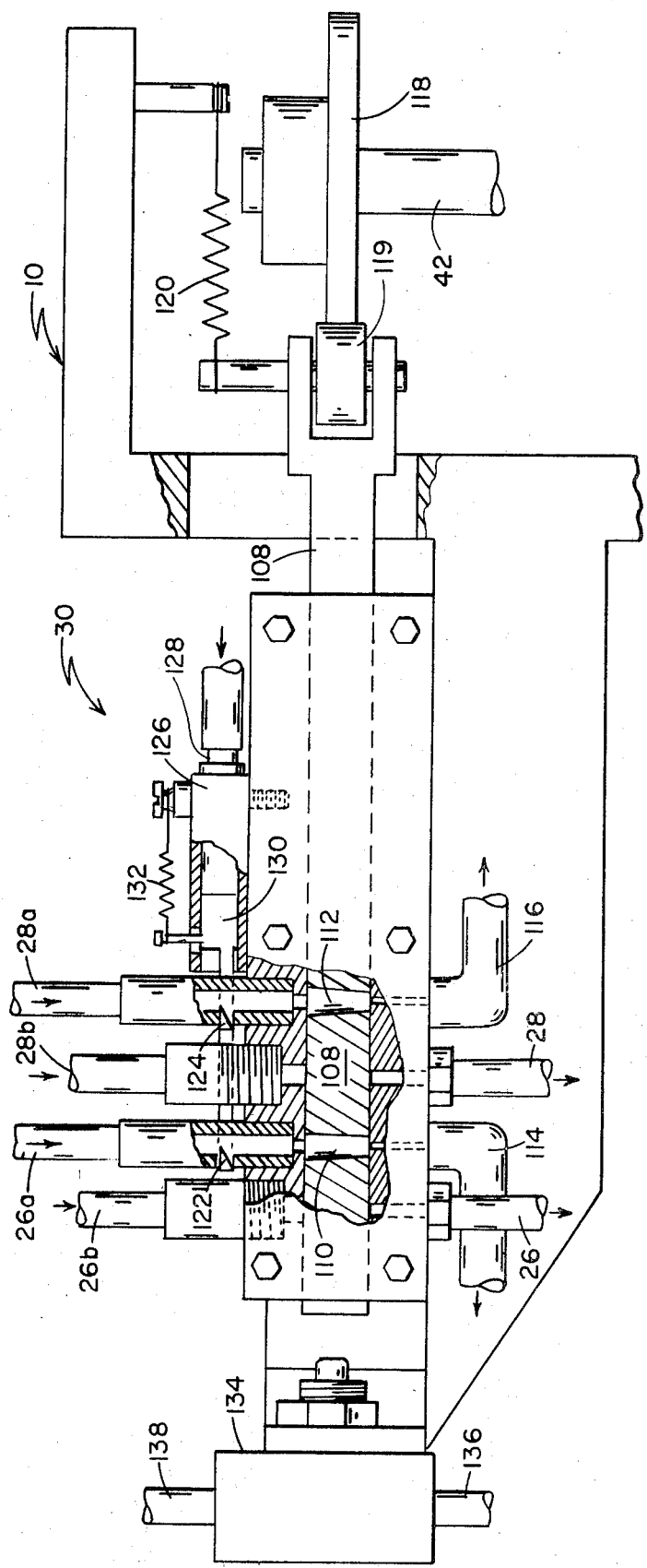
FIG. 5 is a side elevation, partially in section, of a portion of the apparatus of FIG. 2.

As shown in FIG. 5 this device includes a slide 108 having cavities 110 and 112 of appropriate size and shape to accommodate a single spring 109. Cavities 110 and 112 are so placed within slide 108 that at the extreme positions in the motion of slide 108 they are aligned with tubes 26a and 28a and with tubes 26 and 28 respectively.

The vacuum provided for the delivery of springs from spring supply assembly 24 to the transfer device 30 is supplied through couplings 114 and 116. These couplings communicate with cavities 110 and 112 when slide 108 is in the extreme position such that cavities 110 and 112 are also aligned with tubes 26a and 28a respectively. An escapement device permits one spring at a time to enter cavities 110 and 112 under the influence of the vacuum supplied to each of those cavities. The channels 113 and 115 which connected cavities 110 and 112 with couplings 114 and 116 are of reduced diameter to prevent a spring 109 from passing through the cavity and into the vacuum line.

The movement of slide 108 is produced by cam 118 (driven by the main drive shaft 42), follower 119, and loading spring 120. Air pressure is supplied by tubes 26b and 28b which communicate with tubes 26 and 28 through cavities 110 and 112.

The escapement device which insures that a single spring 109 at a time will be delivered to cavities 110 and 112 includes projections 122 and 124 which can protrude through notches cut into tubes 26a and 28a respectively and engage the coils of a spring 109. Piston 130 within air cylinder 126 is integral with projections 122 and 124. A coupling 128 is provided to receive an appropriately pulsed air pressure supply. The pulsed air pressure supply may conveniently be controlled by means of an air valve actuated by the action of slide 108. Air valve 134 with input 136 and output 138 which is connected to coupling 128 is provided for this purpose. The air pressure is sufficient to overcome the force of loading spring 132.

The supply of plugs to operative stations S-1 and S-2 of shuttle 16 has been described, as has been the supply of springs to stations S-3 and S-4 and the removal of assembled spring and plug pairs at operative stations S-7 and S-8. It therefore remains to consider the actual assembly of the spring and plug pairs which occurs simultaneously at operative stations S-5 and S-6. For this purpose we now refer to FIGS. 6 and 7.

Operative stations S-5 and S-6 include a hollow generally cylindrical member 140 which is rigidly affixed to shuttle 16. Shaft 142 is slidably mounted vertically within member 140. A dowel 144 protrudes from shaft 142 and extends through slots in the walls of member 140 to rest upon the uppermost convolution of spring 146, which biases shaft 142 in the upward direction. Shaft 142 may be forced down into the nest element 14 against the influence of spring 146 by rocker arm 148 which is pivoted at 150. The two ends of rocker arm 148 have their lower surfaces in contact with shaft 142 and plunger 86 respectively. The lower end of shaft 142, is illustrated in FIG. 8, has a recessed center portion 198 and an annular rim 200. Rim 200 has recesses 202 which provide vertical surfaces 204 for engagement of a coil of a spring 109.

Each nest element 14 comprises a generally cylindrical body member 152 which is rotatably mounted in the turret 12 by means of bearing units 154, 156. Body element 152 has a slot 158 laterally transversing it and axial channels 160 and 162 above and below slot 158 respectively. In the embodiment shown the slot 158 has a width of 0.045 inch and a height of 0.467 inch. Channel 162 has a diameter of 0.251 inch and channel 160 has an ultimate diameter of 0.170 inch but widens at its upper end to provide a tapered component receiving mouth. Spur gear 74 is attached to the relieved lower portion of body member 152 by means of a set screw (not shown).

A plug 170 effectively serves to reduce the diameter of channel 162 at its lower extremity. Upper surface 172 of plug 170 supports spring 176 within channel 162. Spring 176 loads hollow plunger 164, the upper portion of which extends into slot 158. Plunger 164 has a slotted portion 178 of width preferably the same as that of slot 158 in body member 152. Plunger 164 is oriented within body element 152 so that slots 158 and 178 are aligned.

Disposed within slots 158 and 178 are pincher elements 180, 182 which are pivoted at 184 and 186 respectively and which are of such thickness that they may freely rotate within slot 158. Each pincher element 180, 182 includes an upper finger portion 188, 190 and lower foot portion 192, 194.

In operation the turret 12 rotates continuously as driven by the rotary drive described with relation to FIGS. 2 and 3. The chain 56 is entrained about sprocket 60 in the opposite sense from its entrainment about the sprocket 54. Therefore, shaft 62 is caused to rotate in an opposite sense from the turret drive shaft 58. Thus, the rotary drive mechanism for the nest elements 14, comprising shaft 62 and gears 70, 72, and 74, produces a rotation of the nest elements in a sense opposite to the rotation of the turret 12.

The shuttle 16 is free to rotate with respect to the turret 12. The engagement of pawl 92 on pivoted arm 94 with one of the teeth 90 mounted upon the periphery of turret 12 causes the shuttle 16 to rotate with the turret. The placement of the pivoted arm 94 on the shuttle 16 is chosen such that, when the shuttle is rotating with the turret, the operative stations of the shuttle will be vertically aligned with the nest elements 14. Roll 96, under the influence of spring 100, rolls in an upward direction, as viewed in FIG. 3, upon the relieved front edge 99 of the underside of cam plate 98. When this occurs arm 94 pivots away from the tooth 90 with which it was engaged, thus permitting the shuttle to temporarily rotate, under the influence of air spring 101, in an opposite sense from the rotation of the turret.

While the shuttle 16 and the turret 12 are so aligned and rotating together, the plug supply assembly 18 delivers a plug 107 through each of tubes 20 and 22 to the nest elements aligned with operative stations S-1 and S-2. The plugs 107 are delivered such that they will rest in the nest assembly 14 with the stub portion 111 facing upward.

Similarly, springs 109 are supplied to plug-containing nest elements 14 aligned with operative stations S-3 and S-4. The spring supply assembly 24 provides a continuous supply of springs 109 in tubes 26a and 28a. In the transfer device 30, the projections 122 and 124 operate under the influence of a pulsed air supply and spring 132 to deliver one spring 109 at a time to cavities 110 and 112. With a spring 109 in each of cavities 110 and 112, the slide 108 is forced under the influence of cam 118 into a position where the cavities 110 and 112 are aligned with tubes 26 and 28, respectively. In this position air pressure is supplied through tubes 26b and 28b, respectively, thereby forcing the springs 109 from cavities 110 and 112 into tubes 26 and 28 and thence to the operative stations S-3 and S-4.

The operation of the nest 14 and the operative station S-5 or S-6 to assemble a plug 107 and a spring 109 is as follows. The nest 14 comes into alignment with operative station S-5 or S-6 as described above. The action of plunger 86 and lever arm 148 force the shaft 142 downward into the axial channel 160, thus applying downward pressure upon the spring 109, the plug 107, and the plunger 164. The downward motion of plunger 164 causes dowel 196 to contact the foot portions 192, 194 of pincher elements 180, 182. The rotation of elements 180, 182 thereby produced causes the finger portions 188, 190 to clamp the plug 107 and constrain it to rotate with the rotating nest 14. (Should foot portions 192, 194 strike adjustable stop member 174, further rotation of pincher elements 180, 182 is prevented. This prevents entanglement of finger portions 188, 190 in a spring 109 in the event of a failure to deposit a plug 107 into the nest.)

The nest 14, owing to the gearing described above in connection with FIG. 3, rotates about 2½ times with respect to the turret 12 while a nest 14 and the operative station S-5 (or S-6) are aligned. The spring 109 not only is not gripped to rotate with the nest 14, but is prevented from rotation by vertical surfaces 204 in the tip of the shaft 142 which engage the uppermost convolution of the spring. Thus relative rotation of the plug 107 and the spring 109 is obtained at the same time that they are being forced together by the downward pressure of screwdriver 142 on the spring 109, thereby causing assembly.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. Apparatus for assembling a coil spring component on the stub portion of a second component, said second component having a body portion and said stub portion being integral with and extending outward from said body portion, the inner diameter of said coil spring component being less than the largest transverse dimension of said stub portion comprising a nest structure for receiving coil spring and second components with said coil spring and said stub portion disposed in axially aligned relation, a rotary drive for said nest, clamp structure for securing said second component in said nest structure against rotation relative to said nest structure, an axial drive for causing relative movement of said coil spring component against the stub portion of said second component in said nest structure, and means responsive to the relative axial movement of said coil spring component in response to said axial drive to cause said clamp structure to secure said second component in said nest for rotation therewith and thereby rotate said second component with said nest as said coil spring component and said stub portions are urged toward one another by said axial drive to secure said coil spring component on the stub portion of said second component.

2. Apparatus as defined in claim 1 further including stop means for preventing entanglement of said coil spring component with said nest structure should assembly action occur without said second component within said nest structure.

3. Apparatus for assembling component pairs comprising a nest structure for receiving first and second components in aligned relation, a rotary drive for said nest, a clamp structure for securing said first component in said nest structure against rotation relative to said nest structure, comprising a pair of cooperating pincher elements pivotally mounted within a slot in said nest structure, each said pincher element having at least one first component engaging finger portion and a foot portion an axial drive for causing movement of said second component against said component in said nest structure, and means responsive to the axial movement of said second component in response to said axial drive to actuate said clamp structure and thereby rotate said first component with said nest to secure together said first and second components, said means responsive to said axial movement of said second component comprising a spring-loaded plunger arranged to bear upon each said foot portion, when depressed against said loading spring, to cause rotation of said pincher elements and consequent engagement of said finger portion with said first component.

4. The apparatus of claim 3 wherein said first component comprises a member having a stub and said second component comprises a coil spring sized to engage said stub.

5. The apparatus of claim 4 wherein said axial drive comprises a plunger with a lower tip having a peripheral wall and a recessed center portion, said peripheral wall having relieved regions providing vertical surfaces for engagement of the upper convolution of said coil spring, and means for causing insertion of said plunger into said nest structure to cause insertion of said plunger into said nest structure to cause said movement of said coil spring.

6. Apparatus for the assembly of pairs of first and second components comprising
- a turret having a plurality of nest structures rotatably mounted thereupon;
- a first rotary drive for rotating said turret
- a second rotary drive for rotating said nest structures relative to said turret;
- a first delivery system for delivering first components sequentially to said nest structures;
- a second delivery system for delivering second components sequentially to nest structures in aligned relation to said first components;
- a clamp structure for securing said first component in said nest structure against rotation relative to said nest structure;
- an axial drive for causing movement of said second component against said first component in said nest structure;
- means responsive to the axial movement of said second component in response to said axial drive to actuate said clamp structure and thereby rotate said first component with said nest to secure together said first and second components; and
- an assembled pair removal system to remove the assembled pair from said nest structure.

7. The apparatus as defined in claim 6 in combination with a shuttle having at least one operative station mounted thereupon and means for causing said shuttle to rotate such that said operative station is aligned with a nest structure for a portion of each complete revolution of said turret, said operative station comprising said axial drive.

8. The apparatus as defined in claim 7 including second and third operative stations mounted upon said shuttle, said first and second delivery systems comprising said second and third operative stations respectively.

9. The apparatus as defined in claim 8 wherein said first component comprises a member having a stub thereupon and said second component comprises a coil spring sized to engage said stub.

10. The apparatus as defined in claim 9 wherein said second delivery system comprises
- a vibrating bowl for continuous preliminary alignment of said coil springs;
- a first tubing member for receipt of said preliminarily aligned coil springs form said vibrating bowl;
- a source of vacuum in communication with said first tubing member for the continuous drawing thereinto of the preliminarily aligned coil springs from said vibrating bowl;
- a second tubing member;
- a source of air pressure in communication with said second tubing member;
- a transfer assembly for transfer of said coil springs from said first tubing member to said second tubing member comprising an escapement for isolating a single coil spring and a slide for transfer of said isolated coil spring from said first to said second tubing member;
- said second tubing member being in communication with said third operative station of said shuttle for continuous delivery of coil springs thereto under the impetus of said source of air pressure.

11. The apparatus of claim 7 wherein said means for causing said shuttle to rotate comprises a plurality of teeth disposed about the periphery of said turret; a lever arm pivotally mounted upon a pivot stud which is rigidly affixed to said shuttle, said lever arm constructed and arranged to engage said teeth with one end thereof, said lever arm having a cam follower disposed at its other end; a cam surface over which said cam follower rolls cut to cause engagement of said lever arm with one of said teeth for a portion of a complete revolution of said turret and then to cause rotation of said lever arm about said pivot stud and consequent disengagement of said lever arm with said one of said teeth; and means to return said shuttle to its rest position for subsequent engagement of said lever arm with another of said teeth.

* * * * *